Aug. 22, 1933.    H. HIPPOLD    1,923,310
DEVICE FOR PREVENTING THEFT OF AUTOMOBILES
Filed Sept. 22, 1932
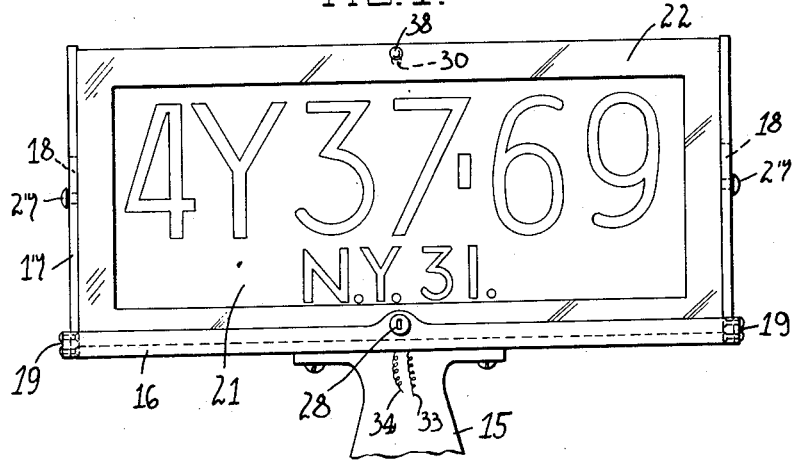
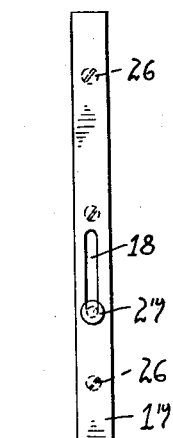
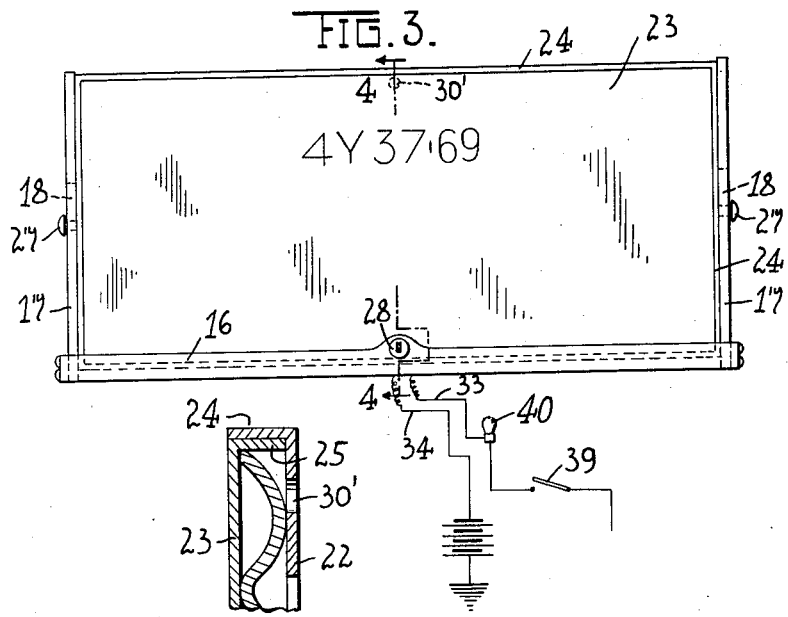
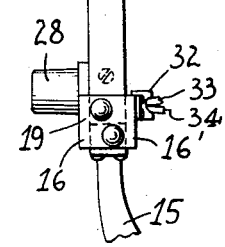
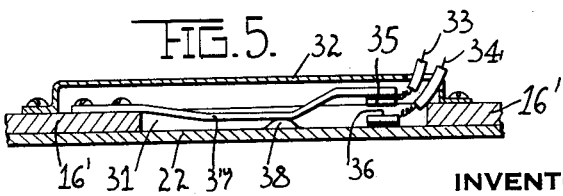
INVENTOR
HENRY HIPPOLD
BY his ATTORNEY Patented Aug. 22, 1933

1,923,310

UNITED STATES PATENT OFFICE 1,923,310

DEVICE FOR PREVENTING THEFT OF AUTOMOBILES

Henry Hippold, New York, N. Y.

Application September 22, 1932
Serial No. 634,273

3 Claims. (Cl. 40—2.2)

This invention relates to devices for preventing the theft of automobiles and more particularly to license plate frames as attached to automobiles.

Such legend bearing license plates are for the purpose of identifying individual vehicles and must be clearly and prominently shown as to be readily observed by the public and particularly by officers, whose business it is to take cognizance of passing cars.

Should a car pass having no such license plate, it becomes the duty of such officer to investigate and ascertain the reason for this condition, thereby acting as a deterrent to unauthorized driving and stealing of cars.

Having this matter in mind, it has become one object of my invention to provide a license plate holder so mounted as to be pivotally turned on a horizontal axis by the driver, whenever the car is parked for any length of time, this presenting a blank to view in place of the legend, thereby plainly indicating, when the car is used in that condition, that it is being unrightfully driven.

A further feature is in the provision of means for locking the plate holder or frame in either its proper or reversed position.

Another purpose is to produce a license plate holder having means, when in an inverted position, to open a switch controlling current to the ignition, starter and distributor circuit, thereby temporarily cutting off its power and preventing the use of the car.

Another object of the invention, when used in its disclosed form but without the current controlling switch, is to provide a license plate holder wherein the license plates may be readily exchanged, and also a license plate holder for use in interstate traffic, bearing two license plates which may be alternately displayed.

These and other advantageous aims, which will become apparent as the description progresses, are accomplished by the novel construction and combination of parts hereinafter described and illustrated in the annexed drawing, forming an important portion of this disclosure, and in which:

Figure 1 is a front elevational view of the device, showing the plate in normal position.

Figure 2 is an edge view of the same, drawn to an enlarged scale.

Figure 3 is a view similar to Figure 1, but showing the plate in a reversed position.

Figure 4 is an enlarged transverse sectional view taken on line 4—4 of Figure 3.

Figure 5 is a further enlarged sectional view taken on line 5—5 of Figure 4.

Referring in greater detail to the drawing, a conventional type of support bracket is designated by the numeral 15 to which is secured a pair of horizontal bars 16—16' having rigidly attached at their ends uprights 17.

These uprights 17 have midway in their length elongated slots and are provided with caps 19 at their lower ends to cover the space between the bars 16—16'.

An oblong rectangular frame for the license plate 21 is constructed of two elements 22—23, respectively front and rear, each having engaging flanges 24—25 close fitting and providing a compartment for the license plate, the rear side of which rests against the frame backing 23 which, as shown in Figure 4, may be a full plate.

These elements are secured after assembly, by fastenings, as the screws 26, uniting the flanges.

Fixed centrally in the ends of the frame are outwardly extending, headed studs 27, their shanks being freely movable in the slots 18 of the uprights, which are close to the frame ends, the arrangement being such, that the frame and license plate as a unit may be raised and lowered relative to the support and it will be obvious that, when the frame is raised, it can be rotated on the studs 27.

It will also be apparent that, when the frame is lowered, its longitudinal elements are positioned within the space 20, between bars 16—16', being securely held upright with the selected side of the license plate displayed.

In order to retain the frame thus exposed, a lock 28 is fixed centrally on the bar 16, the lock being operable by a key to retract a bolt 29 engageable in either the opening 30 of the frame member 23 or 30' of the front member 22, thereby preventing displacement of the frame unauthorizedly.

In addition to the safety means thus provided by the display of a blank in place of a license plate at the will of the operator having a suitable key, and in order to prevent such operator from forgetting that the license plate has not been properly adjusted when he intends using the car after parking, the electric circuit to the ignition and starter system is controlled by the position of the frame.

The rear bar 16' is cut away, as at 31, and disposed thereover is a raised cover 32, through which conductors 33—34 enter to engage respectively with insulated contacts 35—36, the latter being fixed on the frame 22 and the former carried at the end of a spring 37 fixed on the bar 16' to operate in the opening 31.

A raised lug 38 on the frame 22 impinges the spring 37, maintaining the contacts apart, and so long as in this condition, the circuit will be interrupted, however when the frame and license plate are in normal operative position, that is, reversed from that shown in Figs. 4 and 5 the contacts will engage and the circuit be completed.

An independent hand switch 39 may be incorporated, in the wiring system and also a fuse 40 if desired.

As a frame holder without the use of the electric system the device may be used for readily exchanging license plate by lifting the holder out of the bars 16—16', tilting it, removing one plate and substituting another. For interstate traffic, both sides of the holder may be open faced, and the license of two States may be carried, so that the desired plate may be displayed, and by reversing the frame holder, the other plate will be shown.

From the foregoing it will be seen that a simple device for the purpose has been shown in its preferred form, but it is not desired to restrict the details to the exact construction shown, and the right is reserved to make changes within the scope of the appended claims without departure from the spirit of the invention.

Having thus described the invention, what is claimed as new and desired to be secured by Letters Patent, is:

1. A license plate holder comprising a frame having studs fixed in its ends, a support for said frame including a pair of spaced bars, rigid uprights carried at the ends of said bars, said uprights having elongated slots in which said studs freely operate, said frame being reversible and receivable between said bars when in either position whereby it is held upright.

2. A license plate holder comprising a frame having studs fixed in its ends and openings in its opposed side members, a pair of spaced bars, uprights rigidly carried at the ends of said bars in close proximity to the ends of said frame, said uprights having elongated slots in which said studs operate, said frame being reversible on the studs and its side members selectively receivable between said bars, and a lock on one of said bars having a bolt engageable in either of the openings in the side members of said frame.

3. A device for preventing theft of automobiles comprising a license plate holder including a frame and a pair of spaced bars, a spring on one of said bars, an electric circuit having a pair of conductors, one of said conductors leading to said frame and the other to one end of said spring, and means carried by said frame for breaking the circuit when said means contact said spring.

HENRY HIPPOLD.